(12) United States Patent  (10) Patent No.: US 9,207,990 B2
Giles et al.  (45) Date of Patent: Dec. 8, 2015

(54) METHOD AND SYSTEM FOR MIGRATING CRITICAL RESOURCES WITHIN COMPUTER SYSTEMS

(75) Inventors: Chris M. Giles, Ft. Collins, CO (US); Russ W. Herrell, Ft. Collins, CO (US); John A. Morrison, Ft. Collins, CO (US); John R. Planow, Roseville, CA (US); Joseph F. Orth, Ft. Collins, CO (US); Gerald J. Kaufman, Jr., Ft. Collins, CO (US); Andrew R. Wheeler, Ft. Collins, CO (US); Daniel Zilavy, Ft. Collins, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1681 days.

(21) Appl. No.: 11/863,842

(22) Filed: Sep. 28, 2007

(65) Prior Publication Data

US 2009/0089787 A1 Apr. 2, 2009

(51) Int. Cl.
*G06F 9/46* (2006.01)
*G06F 9/50* (2006.01)
*G06F 9/48* (2006.01)
*G06F 9/32* (2006.01)
*G06F 11/07* (2006.01)

(52) U.S. Cl.
CPC ............ *G06F 9/5077* (2013.01); *G06F 9/5061* (2013.01); *G06F 9/327* (2013.01); *G06F 9/4812* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 5,787,095 A | 7/1998 | Myers et al. | |
| 5,842,031 A | 11/1998 | Barker et al. | |
| 6,366,945 B1 * | 4/2002 | Fong et al. | 718/104 |
| 6,421,775 B1 | 7/2002 | Brock et al. | |
| 6,434,628 B1 * | 8/2002 | Bowman-Amuah | 714/48 |
| 6,457,100 B1 | 9/2002 | Ignatowski et al. | |
| 6,668,308 B2 | 12/2003 | Barroso et al. | |
| 6,671,792 B1 | 12/2003 | McAllister | |
| 6,684,343 B1 | 1/2004 | Bouchier et al. | |
| 6,725,317 B1 | 4/2004 | Bouchier et al. | |
| 6,754,755 B1 * | 6/2004 | Johnson et al. | 710/262 |
| 6,763,441 B2 * | 7/2004 | Bobak | 711/162 |
| 6,848,003 B1 | 1/2005 | Arimilli et al. | |
| 6,910,062 B2 | 6/2005 | Arimilli et al. | |
| 6,918,052 B2 | 7/2005 | Bouchier et al. | |
| 6,973,517 B1 | 12/2005 | Golden et al. | |

(Continued)

OTHER PUBLICATIONS

Planning Superdome Cofiguration; Building Blocks and Definitions, Glossary, Appendix A, pp. 287-295; Chapter 4, pp. 161-198.

*Primary Examiner* — Hiren Patel
(74) *Attorney, Agent, or Firm* — Whyte Hirschboeck Dudek S.C.

(57) ABSTRACT

A method and system for migrating at least one critical resource during a migration of an operative portion of a computer system are disclosed. In at least some embodiments, the method includes (a) sending first information constituting a substantial copy of a first of the at least one critical resource via at least one intermediary between a source component and a destination component. The method further includes (b) transitioning a status of the destination component from being incapable of receiving requests to being capable of receiving requests, and (c) re-programming an abstraction block to include modified addresses so that at least one incoming request signal is forwarded to the destination component rather than to the source component.

1 Claim, 4 Drawing Sheets

(56) References Cited

U.S. PATENT DOCUMENTS

| | | | |
|---|---|---|---|
| 7,398,343 B1* | 7/2008 | Marmash et al. | 710/269 |
| 7,461,231 B2* | 12/2008 | Branda et al. | 711/173 |
| 2002/0069270 A1* | 6/2002 | Walton et al. | 709/220 |
| 2002/0144063 A1 | 10/2002 | Peir et al. | |
| 2003/0009641 A1 | 1/2003 | Arimilli et al. | |
| 2003/0037092 A1* | 2/2003 | McCarthy et al. | 709/104 |
| 2003/0131042 A1* | 7/2003 | Awada et al. | 709/104 |
| 2003/0131067 A1 | 7/2003 | Downer et al. | |
| 2004/0107383 A1* | 6/2004 | Bouchier et al. | 714/4 |
| 2004/0143729 A1* | 7/2004 | Bouchier et al. | 713/100 |
| 2004/0268044 A1 | 12/2004 | Heller, Jr. et al. | |
| 2005/0021913 A1 | 1/2005 | Heller, Jr. | |
| 2005/0022203 A1* | 1/2005 | Zisapel et al. | 718/105 |
| 2005/0125604 A1* | 6/2005 | Williams | 711/112 |
| 2005/0240649 A1 | 10/2005 | Elkington et al. | |
| 2005/0246508 A1 | 11/2005 | Shaw | |
| 2006/0020940 A1* | 1/2006 | Culter | 718/100 |
| 2006/0031672 A1 | 2/2006 | Soltis, Jr. et al. | |
| 2006/0036895 A1* | 2/2006 | Henrickson | 714/4 |
| 2006/0059317 A1* | 3/2006 | Kakeda | 711/145 |
| 2006/0149878 A1* | 7/2006 | Carmichael et al. | 710/263 |
| 2006/0282644 A1* | 12/2006 | Wong | 711/206 |
| 2007/0011495 A1* | 1/2007 | Armstrong et al. | 714/39 |
| 2007/0094668 A1* | 4/2007 | Jacquot et al. | 718/104 |
| 2007/0113079 A1* | 5/2007 | Ito et al. | 713/166 |
| 2007/0198797 A1* | 8/2007 | Kavuri et al. | 711/165 |
| 2008/0267066 A1* | 10/2008 | Archer et al. | 370/235 |
| 2008/0320275 A1* | 12/2008 | Duffy et al. | 712/28 |
| 2008/0320291 A1* | 12/2008 | Duffy et al. | 712/244 |

\* cited by examiner

METHOD AND SYSTEM FOR MIGRATING CRITICAL RESOURCES WITHIN COMPUTER SYSTEMS

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to computer systems and methods of operating such systems and, more particularly, relates to the shifting of certain significant or critical system resources within such computer systems.

BACKGROUND OF THE INVENTION

As computer systems have become more complex, with large numbers of processing devices and other hardware resources, it has become possible for one such computer system to operate simultaneously as multiple computers, where each computer has its own operating system. Such is the case in many server computer systems in particular. In such systems, although a customer (or operating system) may perceive a single computer, the portion of the system running as this single computer (a "partition") may be distributed across many different hardware resources that are unaffiliated with one another and/or in any are separately replaceable "Field Replaceable Units" (FRUs).

Today's customers are asking for computer systems that will allow them to increase their return on their investment by improving the utilization of their compute infrastructure. In addition, they are asking for solutions with higher availability, serviceability and manageability. In particular, they are asking for solutions that allow them to be able to replace failing components of a computer system without bringing down or rebooting the computer system. Yet with respect to conventional computer systems such as those discussed above it often is difficult or impossible to shift the utilization of hardware resources, or to replace hardware resources, without bringing down or rebooting the computer systems or at least individual partitions of the computer systems.

One reason why it is difficult to shift the utilization of hardware resources, or to replace hardware resources, without bringing down/rebooting a computer system is that such hardware resources provide certain functional resources (for example, real-time counters) that the operating system(s) and/or partition(s) of the computer system tend to rely upon in order to work properly, and that can be referred to as "critical" resources. Because some or all of these critical resources are necessary or at least desirable for proper operation, in order to achieve successful shifting of hardware resources generally, these critical resources must also be shifted. Yet conventional computer systems, including many of today's cellular midrange and high-end servers, face several limitations relating to the shifting of such critical resources.

More particularly, many OS-critical resources reside at architected addresses (such as the boot vector) that are "root resources", which are described to the OS or abstracted from the OS by firmware interfaces. Because many conventional cell-based servers map these root resources to fixed physical paths leading to specific, fixed "root" cells, conventional operating systems running on such servers cannot handle the removal, loss or modification of the root cells, at least not without bringing down the partition(s) supporting those operating systems.

Further, in order for the shifting of such root resources at root cells to occur in a manner that would not require bringing down a partition, such shifting would need to happen in a manner that did not involve the operating system, such that the operating system was unaware of and not impacted by such shifting. Yet many conventional approaches for shielding an operating system from critical resources typically require full machine virtualization at a software level. Such virtualization can often result in lower performance (e.g., some cycles that could otherwise be given to the application are instead given to the process virtualizing the machine), and also may be inconsistent with providing electrical isolation and/or may be tied to specific operating systems or versions thereof.

For at least the above reasons, it would be advantageous if an improved method and system for shifting critical (or other significant or desirable) resources within a computer system could be developed that, in at least some embodiments, was consistent with the shifting and/or replacement of hardware resources such as processing devices within a computer system. Further, it would be advantageous if in at least some embodiments such improved method and system for shifting critical (or other significant or desirable) resources was consistent with the shifting/replacement of hardware resources in a manner that did not require bringing down/rebooting of the overall system or modifying the operating system (or system partition).

SUMMARY OF THE INVENTION

In at least some embodiments, the present invention relates to a method of migrating at least one critical resource during a migration of an operative portion of a computer system. The method includes (a) sending first information constituting a substantial copy of a first of the at least one critical resource via at least one intermediary between a source component and a destination component. Further, the method also includes (b) transitioning a status of the destination component from being incapable of receiving requests to being capable of receiving requests, and (c) re-programming an abstraction block to include modified addresses so that at least one incoming request signal is forwarded to the destination component rather than to the source component.

Additionally, the present invention in at least some embodiments relates to a method of shifting at least one critical resource of a computer system in conjunction with a partition migration of the computer system. The method includes providing first and second cells of the computer system, where each of the cells includes a respective processing device, a respective agent component, and a respective additional component that is capable of supporting the at least one critical resource. The method also includes determining that the shifting of the at least one critical resource is necessary or desirable, and copying the at least one critical resource from the additional component of the first cell to the additional component of the second cell. The method additionally includes reconfiguring the agent component of the first cell so that incoming messages are forwarded to the additional component of the second cell via the agent component of the second cell rather than to the additional component of the first cell.

Further, the present invention in at least some embodiments relates to a system for migrating at least one critical resource during a migration of an operative portion of a computer system. The system includes an intermediary fabric component, first and second agent components coupled by way of the intermediary fabric component, and first and second additional components each of which is capable of supporting the at least one critical resource. A first of the at least one critical resources supported by the first additional component is capable of being substantially copied to the second additional component via the first and second agent components and the intermediary fabric component.

DETAILED DESCRIPTION OF THE PREFERRED EMBODIMENT

Figure 1:
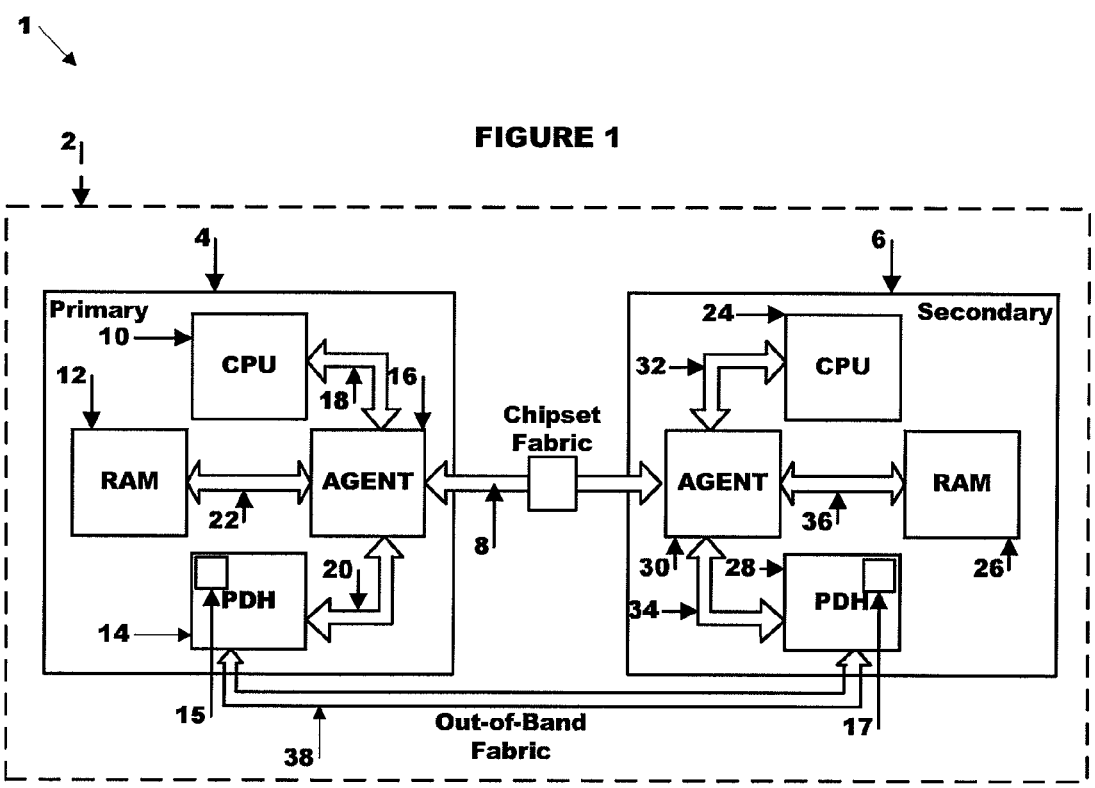
FIG. 1 shows in schematic form components of a computer system having multiple cells that are in communication with one another, in accordance with one embodiment of the present invention.

Referring to FIG. 1, components of an exemplary computer system 1 in accordance with at least one embodiment of the present invention are shown in a simplified schematic form. As shown, the computer system 1 includes a partition 2 having two field replaceable units (FRUs) or "cells", namely, a first cell 4, a second cell 6, and a fabric 8 to facilitate communication between those two cells. The two cells 4, 6 can be understood to be formed on two separate printed circuit boards that can be plugged into, and connected by, a backplane (on which is formed or to which is coupled the fabric 8), Although the computer system 1 of the present embodiment includes only the single partition 2 having the first and second cells 4 and 6, it is nevertheless intended to be representative of a wide variety of computer systems having arbitrary numbers of partitions with arbitrary numbers of cells and/or circuit boards. For example, in other embodiments, multiple partitions, each having a single cell or possibly more than two cells, can be present and coupled with one another by way of the fabric 8. Alternate embodiments can also have different configurations of resources on a cell.

In at least some embodiments, the computer system 1 is a sx1000 super scalable processor chipset available from the Hewlett-Packard Company of Palo Alto, Calif., on which are deployed hard partitions (also known as "nPars") on one of which exist the cells 4, 6. Hard partitions allow the resources of a single server to be divided among many enterprise workloads and to provide different operating environments (e.g., HP-UX, Linux, Microsoft Windows Server 2003, OpenVMS) simultaneously. Such hard partitions also allow computer resources to be dynamically reallocated. Although the computer system 1 can be the super scalable processor chipset mentioned above, it need not be such a chipset and instead in other embodiments can also take a variety of other forms.

Each of the cells 4, 6 is capable of supporting a wide variety of hardware and software components. More particularly as shown, each of the cells 4, 6 includes a respective central processing unit (CPU) 10, 24. The CPUs 10, 24 of the partition 2 formed by the cells 4, 6 support an operating system (OS) of the partition, as well as perform (or at least are capable of performing) one or more applications. Additionally, each of the cells 4, 6 includes a respective agent component, namely a processor agent 16 on the cell 4 and a processor agent 30 on the cell 6. Additionally, respective Processor Dependent Hardware (PDH) blocks 14, 28 and respective memory blocks 12, 26 are present on each of the respective cells 4, 6. In other embodiments, one or more of the cells 4, 6 can include components other than or in addition to those mentioned above. Further, in the present partition 2 having the cells 4, 6, the cell 4 serves as a "root" or primary cell that hosts "critical" resources that are necessary for (or, alternatively, at least significant or desirable in relation to) the functioning of the partition 2. These critical resources, which are described in more detail below, in particular are hosted/stored within the PDH block 14 of the primary cell 4.

The respective CPUs 10, 24 typically are formed on chips that are coupled by way of electrical connectors to the respective circuit boards corresponding to the respective cells 4, 6. Although the CPUs 10, 24 are intended to be representative of a wide variety of processing devices, in the present embodiment, the CPUs 10, 24 are Itanium processing units as are available from the Intel Corporation of Santa Clara, Calif. In other embodiments, one or more of the CPUs 10, 24 can take other forms including, for example, Xeon and Celeron also from the Intel Corporation. In alternate embodiments, one or more of the CPUs can be another type of processing unit other than those mentioned above including a wide variety of processing units available from the Advanced Micro Devices (AMD) of Sunnyvale, Calif. Different CPUs on a given cell, and/or on different cells need not be the same but rather can differ from one another in terms of their types, models, or functional characteristics. Also, although the present embodiment has only the single CPUs 10, 24 each having a single CPU core on each of the cells 4, 6 respectively, the present invention nevertheless is also intended to encompass embodiments in which cells and/or partitions have more than one CPU, as well as embodiments in which one or more individual CPUs have more than one (rather than merely one) CPU core.

With respect to the memory blocks 12, 26, they can take a variety of different forms depending upon the embodiment. For example, in one embodiment of the present invention, the memory blocks 12, 26 can be divided into multiple memory segments organized as dual in-line memory modules (DIMMs). In other embodiments, the memory blocks 12, 26 can include a main memory formed from conventional random access memory (RAM) devices such as dynamic random access memory (DRAM) devices. In alternate embodiments, the memory 12, 26 can be formed from static random access memory (SRAM) devices such as cache memory, either as a single level cache memory or as a multilevel cache memory having a cache hierarchy. In further embodiments, the memory 12, 26 can be formed from other types of memory devices, such as memory provided on floppy disk drives, tapes and hard disk drives or other storage devices that can be coupled to the computer system 1 of FIG. 1 either directly or indirectly (e.g., by way of a wired or wireless network) or alternatively can include any combination of one or more of the above-mentioned types of memory devices, and/or other devices as well. Notwithstanding the fact that in the present embodiment, the respective memory blocks 12, 26 are shown to be in direct communication with the respective processor agents 16, via communication links 22 and 36, respectively, the present invention is also intended to encompass other embodiments with alternate arrangements. For example, in some such embodiments, the respective memory blocks 12, 26 of the respective cells 4, 6 are in direct communication with the respective CPUs 10, 24 (or portions of those CPUs, such as sockets or cores) of those respective partitions, rather than in direct communication with the respective processor agents of those cells.

As for the respective processor agents 16, 30 on the cells 4, 6 respectively, each of these serves as an intermediary that is in communication with all of the other respective components of the respective cells as well as in communication with the fabric 8 (and thus capable of communication with each other). More particularly, the respective processor agents 16, 30 are capable of communicating with the respective PDH blocks 14, 28 by way of respective communication links 20, 34, with the respective CPUs 10, 24 via respective communication links 18, 32, and with the respective memory blocks 12, 26 via the respective communication links 22, 36. Additionally, the processor agents 16, 30 have several other purposes relating to the identification, configuration, controlling and observation of the partition 2 and its resources such as the CPUs 10, 24 or other resources.

More particularly, the processor agents 16, 30 serve to either directly manage, or serve as the interface by which are managed, the partition critical resources within the respective PDH blocks 14, 28, particularly at times of on-line repair, upgrades and/or dynamic partitioning of the resources located on the root cell of the partition 2. In this regard, the processor agents 16, 30 are able to manage migration of partition critical resources out of one cell and into another, as discussed further below. It is typically intended that such migration of critical resources should proceed without any involvement or awareness on the part of the OS. Also, the processor agents 16, 30 include address abstraction tables or blocks such that abstract or virtual addresses suitable for communicating within the partition can be converted into real physical fabric addresses suitable for communicating across the fabric, addressing locations such as memory locations or locations associated with the PDH blocks 14, 28. In addition, the processor agents 16, 30 include reverse abstraction tables or blocks such that the real physical fabric addresses suitable for communicating across the fabric can be converted back into abstract or virtual addresses suitable for communicating within the partition. In general, the abstraction blocks are pre-programmed with the abstractions during the configuration of the partition 2, as well as during the process of transitioning critical resources as discussed below.

As for the PDH blocks 14, 28, each of these blocks contains, or is capable of containing, partition critical resources. Such critical resources, which also can be referred to as root resources, are critical for the proper functioning of the computer system 1 and partition 2 and can include a variety of resources that are necessary for performing various operations. For example, the critical resources can include system firmware entities such as boot read-only memory (ROM) and other boot resources, system health resources and/or identification resources (e.g., identification codes). Also for example, the critical resources can include OS/partition entities such as input/output (I/O) Streamlined Advanced Programmable Interrupt Controller (SAPICs), Advanced Configuration and Power Interface (ACPI) functions or fixed register sets, timers, clocks (or times), etc. While some of the critical resources are used by system firmware, others are used by the OS of the partition. Also, while some of the critical resources are autonomously updated, others are updated by way of the system firmware and/or OS. As discussed further below, in some circumstances some of the critical resources experience "side-effects" when the resources are read or written to.

In at least some embodiments, certain of the critical resources within the respective PDHs 14, 28, when working in conjunction with firmware running in the computer system 1, and with the respective processor agents 16, 30 (and possibly other components), form a complex management intelligence (CMI) that is capable of identifying, managing, configuring and observing the various resources within the computer system 1 that are associated with the partition 2 and possibly one or more other partitions of the computer system. Such a CMI generally operates in isolation from the OS(s) running on the partition(s), such that the OS(s) are unaware of the CMI. As will be discussed further below, each of the cells 4, 6 of the multi-cell partition 2 of FIG. 1 is capable of containing critical resources used by the partition 2 during a normal mode of operation of the partition 2. In particular, the critical resources reside within the PDH blocks 14, 28 of the respective cells 4, 6.

Under certain circumstances it becomes desirable to migrate the critical resources from the PDH block of one cell to the PDH block of an alternate or secondary cell. To achieve such a migration, it is further desirable that a "blank" resource in a PDH containing no running partition-critical processes exist within the secondary cell. During migration, running critical resources from the migrating PDH block are transferred to the PDH block of the secondary cell. In the exemplary embodiment shown in FIG. 1, the migrating PDH block can be, for example, the PDH block 14 of the cell 4, while the recipient PDH block can be, for example, the PDH block 28 of the cell 6. Such migration of the PDH block is achieved through the use of the processor agents 16, 30 and associated CMI. Additionally, in support of migration, and located within the respective PDH blocks 14, 28 are interrupt accumulators 15, 17 respectively. Each of the interrupt accumulators 15 and 17 are used to accumulate interrupts generated during the migration of the autonomously updated resources, as will be described in more detail below.

Notwithstanding the aforementioned exemplary manner of migration corresponding to FIG. 1 in which the critical resources of the PDH block 14 are migrated to the PDH block 28, it should be understood that a variety of different manners of migration are possible depending upon the embodiment or circumstance. For example, in another circumstance, it is possible that one critical resource will be migrated from the PDH block 14 to the PDH block 28 while another critical resource will be migrated in the opposite direction. Additionally for example, in another circumstance it is possible that one critical resource will be migrated to or from another PDH block associated with another cell (not shown) from or to one of the PDH blocks 14, 28. Generally speaking, critical resources can be farmed to many different PDHs on many different cells. Moving critical resources from one PDH block to another can happen from multiple cells to multiple cells, in the process of clearing out just one cell for deletion from the partition (or repair). At the same time, it should be further noted that, in all of these exemplary circumstances, migration of a given resource from one PDH block to a recipient PDH block is predicated upon the recipient PDH block having a blank "resource" capable of receiving the running resource.

With respect to the fabric 8, it is a hardware device (such as a crossbar switch) that can be formed as part of (or connected to) the backplane of the computer system 1. The cells 4, 6 are connected to the fabric 8 during configuration when those cells are installed on the partition 2 within the computer system 1. The fabric 8 serves as a global intermediary for communications among the various resources of the computer system 1 during operation of the computer system, including resources associated with different partitions of the computer system. In order for signals provided to the fabric 8 to be properly communicated via the fabric to their intended destinations, in the present embodiment, the signals must take on fabric (or global) addresses that differ from the partition addresses employed by the signals when outside of the fabric. Although as shown in FIG. 1 the processor agents 16, 30 are linked by way of the fabric 8, in the present embodiment an additional or "out-of-band" fabric 38 also links the PDH blocks 14, 28 of the different cells 4, 6.

To improve availability and serviceability of partitions of the computer system 1 such as the partition 2, it is desirable to continue to run a given partition even when a component on a cell is hosting all or some of the partition critical resources and the cell requires replacement. Likewise, it is desirable to continue to run a given partition as resource needs evolve or change, such that it becomes appropriate to share the resources of a given cell among multiple partitions, becomes appropriate to expand the number of cells being utilized by a given partition, or becomes appropriate to shift the given partition from utilizing the resources of one cell to utilizing the resources of another cell. In accordance with at least some embodiments of the present invention, when such migrations of resources associated with a given partition occur, one or more of the critical resources of a PDH block such as the PDH block 14 of the primary cell 4 can be migrated (e.g., moved) to a different PDH block such as the PDH block 28. By migrating the critical resources, it is possible to avoid stalling or shutting down a partition of the computer system such as the partition 2.

Figure 2:
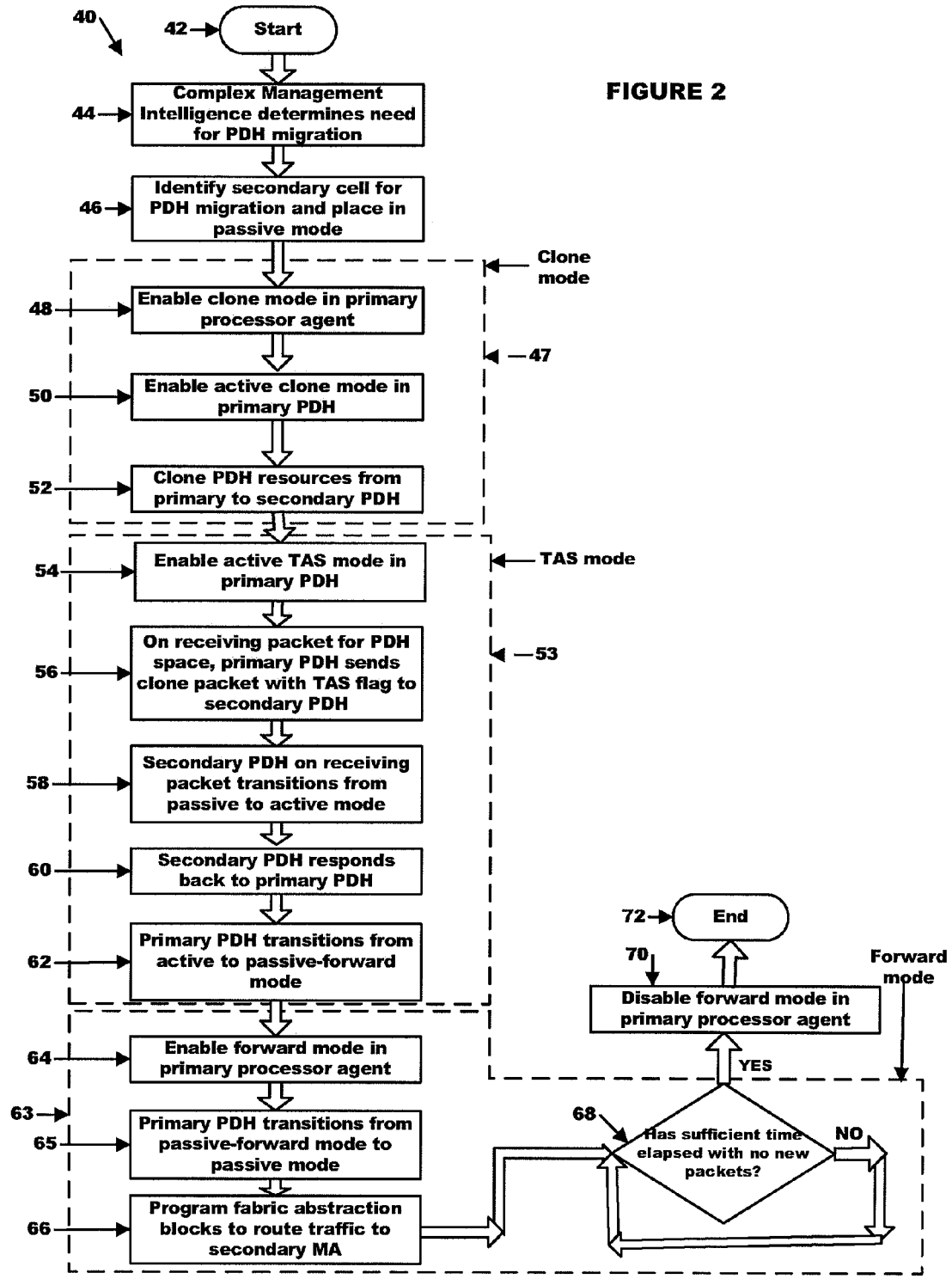
FIG. 2 is a flowchart showing exemplary steps of operation, which in particular relate to a migration of critical resources within the computer system of FIG. 1, in accordance with one embodiment of the present invention.

Turning to FIG. 2, a flowchart 40 is provided that shows exemplary steps of such a migration operation in which critical resources found on a primary PDH block of a first cell, namely, the PDH block 14 of the primary cell 4 of FIG. 1, are migrated to a secondary PDH block of a second cell, namely, the PDH block 28 of the cell 6. As shown, the process begins at a step 42. Prior to the execution of the flowchart 40 (e.g., before the time of the step 42), the system operates in a normal mode of operation and some if not all of the critical resources for the partition 2 are located at the primary PDH block 14 of the primary cell 4. Accessing of those critical resources during the normal mode, for example, by way of an OS associated with the partition 2 and running on the CPU 10 of the primary cell 4, occurs by way of communication signals that proceed between that CPU and that PDH block by way of the communication links 18, 20 and the processor agent 16 of the primary cell. However, at the step 42, an event or circumstance occurs (e.g., a device failure or a change in resource needs) as a result of which it becomes necessary or desirable to perform a migration of the critical resources of the primary PDH block 14 to another location, which in this example is the secondary PDH block 28.

After starting at the step 42, the CMI (e.g., as formed by firmware, the processor agent 16 and PDH 14 of the primary cell 4) at a step 44 determines whether there exists a need for a migration of the critical resources of the primary PDH block 14. For example, the CMI can detect a need for on-line repair of a component of the computer system 1, a need for upgrading of a portion of the computer system, or a need for dynamic partitioning (e.g., a need to adjust the assignment of resources to one or more partitions of the computer system). Once the CMI determines that a need for a migration of critical resources exists, then at a step 46 the CMI (or some other mechanism) identifies a secondary cell that is an appropriate destination for the critical resources being migrated. The secondary cell, which in the present example is the cell 6, typically will have a respective secondary PDH block such as the PDH block 28 that can be the recipient of the critical resources. Upon the secondary cell and PDH block being identified, some, if not all, of the PDH block components are then placed in a "passive" mode implying that these PDH block components are not being used as functional PDH block components, and that they are to be the new hosts for the critical resources.

Upon the making of the determinations at the steps 44 and 46, the migration process then begins in earnest at a step 48. As illustrated in FIG. 2 by first, second and third dashed boxes 47, 53 and 63, respectively, and further set forth in Table 1 below, the overall migration process can be understood to encompass first, second and third system modes in between times at which the partition 2 leaves (e.g., at the step 46) and later returns (e.g., at a step 70 discussed below) to a normal mode of operation. As shown, these first, second and third modes can be referred to as a clone mode, a transfer of active status (TAS) mode, and a forward mode. Generally speaking, during the clone mode, a primary objective is to build a duplicate of the critical resources of the primary PDH block 14 in the secondary (target) PDH block 28. Subsequently after the clone has been built and verified, the primary PDH block 14 is decommissioned from the partition 2 in favor of the secondary PDH block 28 during the TAS mode. Then, after operation in the TAS mode, operation in the forward mode occurs in which the primary PDH block 14 is disabled and all requests are handled directly by the secondary PDH 28.

Further as shown, each of these three modes of operation includes several steps of operation, and can be understood to encompass certain sub-modes of operation that more particularly pertain to the operational status of certain components of the computer system 1 involved in the migration. More particularly as shown in Table 1, the respective processor agents 16, 30 of the respective cells 4, 6 as well as the primary and secondary PDH blocks 14, 28 need not share the same operational status as one another during the clone, TAS and forward modes, nor need those devices be in communication with one another or even be aware of the operational status of one another during those modes. For example, during the clone mode, while each of the primary processor agent 16, the primary PDH 14 and the secondary PDH 28 is involved in this mode of operation, the secondary processor agent 30 is unaware of the operation in this mode. Also as already noted above, the steps associated with the migrating of critical resources in the present embodiment are "invisible" to the OS associated with the partition 2. That is, the OS associated with the partition 2 with respect to which the migration is occurring is not aware of or affected by the performance of these steps, and can continue to operate during and after the migration of the critical resources of the primary PDH block 14 to the PDH block 28 as if nothing had changed.

TABLE 1

| System | Primary Agent | Secondary Agent | Primary PDH | Secondary PDH |
|---|---|---|---|---|
| Row Normal | n/a | n/a | Active | Passive |
| Row Clone(part | Clone | n/a | Active | Passive |
| Row Clone(part | Clone | n/a | Active Clone | Passive |
| Row TAS(part A) | Clone | n/a | Active TAS | Passive |
| Row TAS(part B) | Clone | n/a | Active TAS | Active |
| Row TAS(part C) | Clone | n/a | Passive-Forward | Active |
| Row Forward | Forward | n/a | Passive | Active |
| Row Normal | n/a | n/a | Passive | Active |

Referring still to FIG. 2, steps 48 through 52 represent operations performed by the computer system 1 when in the clone mode of the box 47. More particularly, the step 48 involves enabling the clone mode within the primary processor agent 16 such that the system mode changes from the normal mode to the clone mode, and more particular to a part A of the clone mode as shown in row 2 of the Table 1. Next, at the step 50, the primary PDH block 14 is placed in an active clone mode as shown by the row 3 of the Table 1, such that the computer system 1 can be said to enter a second portion of the clone mode, namely, part B of the clone mode. When the processor agent 16 enters the clone mode and the primary PDH block 14 is placed in an active clone mode, it becomes possible to clone the primary PDH block 14 to the secondary PDH block 28 (e.g., to copy the critical resources of the primary PDH block to the secondary PDH block).

When in the active clone mode, the primary PDH block 14 is actively participating in the operation of the partition 2, and is migrating the critical resources available at that PDH block to the secondary PDH block 28, while at the same time also tracking the state of the OS. During this time, it is still the primary PDH block that makes the decisions, on a resource-by-resource (and possibly partition-by-partition) basis, as to what action should be taken in response to any given request to the PDH block. It should further be noted that, throughout the operation of the system in the clone mode (including both parts A and B of the clone mode), those components of the secondary PDH block 28 that are pending targets of the migration remain in a passive mode such that they are not capable of responding to requests, albeit they are able to receive information by which the critical resources of the primary PDH block 14 are cloned to the secondary PDH block 28.

Then, at the step 52, the critical resources of the primary PDH block 14 are cloned to the secondary PDH block 28. Request packets from the primary CPU 10 arrive at the primary PDH block 14 via the primary processor agent 16, which resolves abstract (e.g., partition) addresses used by the CPU into real fabric addresses suitable for the PDH block 14. As the request packets arrive at the primary PDH block 14, the PDH block determines the proper data/address update for cloning to the secondary PDH block 28, and then sends a clone of the requested packet via the fabric 8 to the secondary PDH block (more particularly, the clone packet is sent to the secondary PDH block via each of the communication links 20, 34, each of the primary and secondary processor agents 16, and the fabric 8). Once the clone packet reaches the secondary PDH block 28, that block performs the clone. Finally, after the cloning has occurred, the secondary PDH block 28 then sends a response back to the primary PDH block 14, which in turn sends a response to the requesting CPU 10 such that the access is retired.

During the cloning process represented by the step 52, the primary PDH block 14 operates to mirror accesses that it receives from the CPU 10 to the secondary PDH block 28 so that latter block remains current with the former block. The exact manner of operation of the secondary PDH block 28 in responding to requests that it receives is discussed in further detail with respect to FIG. 3, and can vary depending upon the type of request. For example, read and write requests are handled differently from one another as explained in greater detail below. Generally speaking, however, for a PDH read/write request from a CPU, the data is first read in the primary PDH and then written to the secondary PDH, all before the CPU is released to perform another transaction. This effectively clones the information from one PDH to another. It is also possible for the CMI to effect a complete clone of the entire primary PDH block 14, by walking through all the primary PDH addresses and performing a clone mode read operation. In this manner, the data is updated both in the primary and secondary PDH blocks 14 and 28 respectively, effectively keeping the data between the primary and the secondary in synchronization, and coherent, when the OS or other fabric-based writes attempt to update resources.

When all resources from the primary PDH block 14 have been migrated to the secondary PDH block 28 in this manner, the computer system 1 then switches to the TAS mode of the box 53. Operation in this mode, which includes steps 54 through 62 of the flowchart 40, generally involves transitioning from operating the primary PDH block 14 in an active manner to operating the secondary PDH block 28 in an active manner. More particularly with respect to the step 54, that step involves enabling the active TAS mode within the primary PDH block 14, such that the overall system mode changes from the clone mode to a part A of the TAS mode as shown in row 4 of the Table 1.

Next, at the step 56, whenever the primary PDH block 14 receives a transaction for the components of the PDH being migrated, either from the CMI, or from any CPU in the partition (such as the CPUs 10 or 24), the primary PDH block 14 initiates a transfer of active status from itself to the secondary PDH block 28 by way of the fabric 8 (and also the processor agents 16, 30 and communication links 20, 34). In doing this, the primary PDH block 14 acts as though it were operating in the active clone mode except insofar as the primary PDH block attaches an additional TAS flag to the cloned transaction sent to the secondary PDH block 28. Upon receiving the clone transaction with the TAS flag at the secondary PDH block 28, that block at the step 58 then transitions from passive status to active status, such that the system mode changes to the part B of the TAS mode as shown in row 5 of the Table 1. As part of this transition, the secondary PDH block 28 updates its resources and begins tracking the OS state. At this point for a short period, both the primary and secondary PDH blocks 14, 28 respectively are both in the active mode (active TAS mode in the case of the primary PDH block) and are tracking the OS state.

Next at a step 60, the secondary PDH block 28 responds back to the primary PDH block 14 after fulfilling the clone request and transitioning to its active mode. Upon the response arriving at the primary PDH block 14, that PDH block then changes from its active (active TAS) mode to a passive-forward mode at the step 62, such that the overall system mode changes to a part C of the TAS mode as shown in row 6 of the Table 1. After this has occurred, the primary PDH block 14 sends a response to the requesting CPU 10 such that the access is retired. The system mode, however, remains in the part C of the TAS mode until all the critical resources of the primary PDH block 14 have been cloned and translated to the part C of the TAS mode. While waiting for the last critical resource to transition through the part C of the TAS mode, accesses to those resources that have already been transitioned still arrive at the primary processor agent 16 and the primary PDH block 14 and are handled by the PDH block as indicated above. Subsequent to transitioning all of the critical resources of the primary PDH block 14 to the part C of the TAS mode, the primary PDH block does not actively participate in the operations of the partition 2 or track the OS state.

Although the above discussion describes the switching of the secondary PDH block 28 from its passive mode to its active mode as if it occurs in a single operation in response to a single clone signal, this process can also occur in a recurrent or repeated manner on a resource-by-resource basis as requests for different resources are received by the primary PDH block 14 and subsequently sent to the secondary PDH block 28. Also, it should be mentioned that the OS is unaware of the transitions occurring at the PDH blocks 14, 28 during the TAS mode. Further, throughout the TAS mode (including the parts A, B and C of the TAS mode), the primary processor agent 16 remains in its clone mode unaware of the transitions/operations being performed by the primary and secondary PDH blocks 14, 28.

Upon the completion of the step 62, the computer system 1 switches to the forward mode represented by the box 63, which includes steps 64 through 68 shown in FIG. 2. In the forward mode, the primary processor agent 16 and the primary PDH block 14 are disabled from active participation in the operations of the partition 2. Any access signal that would have previously been directed to the formerly-active primary PDH block 14 is forwarded by the primary processor agent 16 to the secondary PDH block 28 rather than to the primary PDH block. More particularly, the step 64 involves changing the primary processor agent 16 from the clone mode to the forward mode, such that the overall system mode transitions to the forward mode as shown in row 7 of the Table 1. Further at the step 66, the abstraction blocks within all processor agents within the partition, such as the processor agent 16, are re-programmed to route traffic originally destined for the primary PDH block 14 to the secondary processor agent 30 (and thus to the secondary PDH block 28) instead.

As a result, when the computer system 1 is in the forward mode, signals from any CPU (such as the CPU 10) that originally would have been directed to the primary PDH block 14 instead now proceed, via the fabric 8 (and the processor agents 16, 30), to the secondary PDH block 28. Responses from the secondary PDH block 28 also proceed in a reverse manner back to the requesting CPU (such as the CPU 10). As in the case of the handling of signals in the clone mode, the handling of signals in the forward mode can depend somewhat upon the type of signal. For example, read signals from the CPU 10 can be handled differently than write signals, as discussed in further detail below with respect to FIG. 4.

Subsequent to the re-programming of the abstraction blocks, the process advances to a step 68, at which a determination is made as to whether to disable the critical resources migration process. In particular, after all abstraction tables have been re-programmed at the step 66, it is determined whether a sufficient time has elapsed to ensure that all in-flight packets have either timed-out or reached their destination. If such a time period has not yet occurred, the process stays at the step 68. However, assuming that such a time period is determined to have elapsed in the step 68, then the forward mode is disabled at a step 70, and the overall system mode changes back to the normal mode as shown in row 8 of the Table 1. Once in the normal mode, all requests by CPUs (such as the CPU 10) to access resources are directed via their respective processor agents (such as the processor agent 16) and the fabric 8 to the PDH serving the critical resources (such as PDH 28), via its associated processor agent (such as processor agent 30). Thus, as a result of the process of FIG. 2, the critical resources of the primary PDH block 14 are fully migrated to the secondary PDH block 28 such that the secondary PDH block can completely take the place of the primary PDH block, without any knowledge by or involvement of the OS. The process thus ends by at a step 72.

Figure 3:
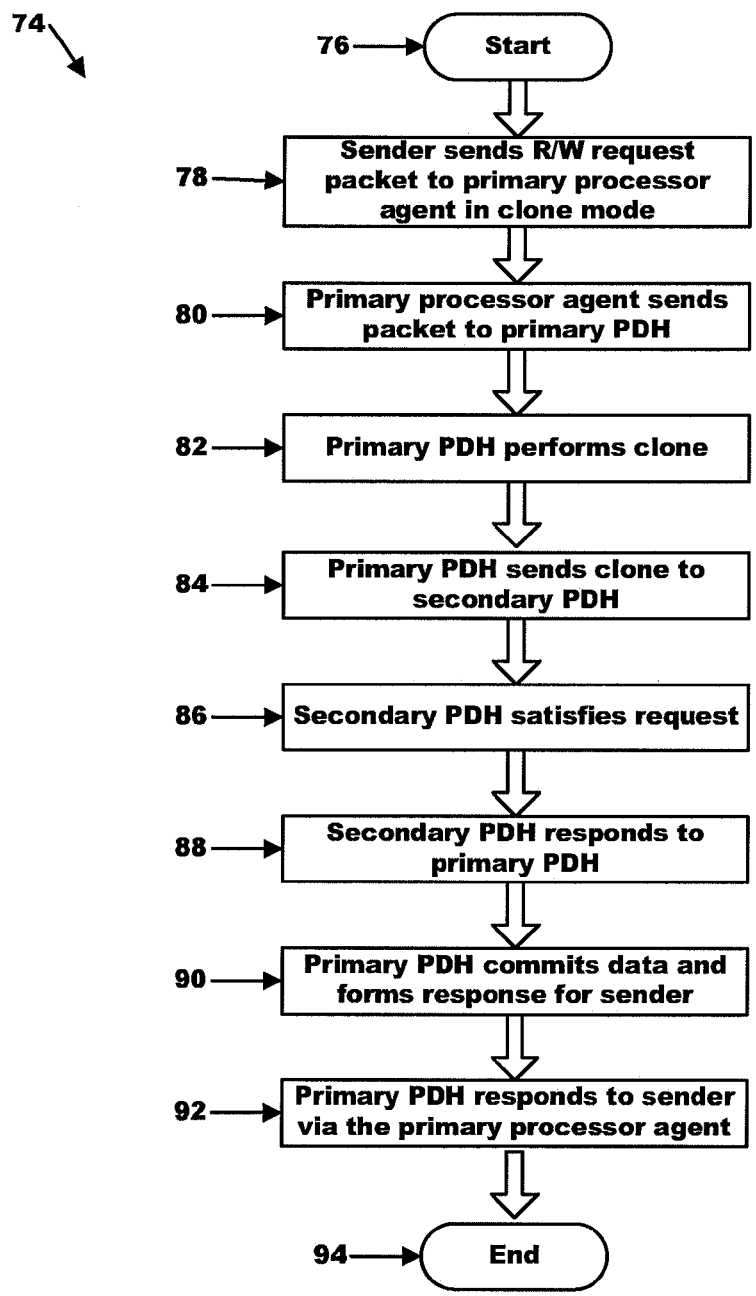
FIG. 3 is a flowchart showing exemplary steps of operation, which in particular relate to a first mode of handling read/write requests as part of the migration of critical resources of FIG. 2, in accordance with one embodiment of the present invention.

Turning now to FIG. 3, an additional flowchart 74 shows in more detail exemplary steps of operation of the computer system 1 relating to the handling of a read or write request by the processor agents 16, 30 in the clone mode, which steps can be generally understood to correspond to (and be performed as part of) the step 52 of FIG. 2. As shown, after starting at a step 76, at a step 78 a sender (e.g. the CPU 10 or any other resource on the partition 2) desiring read/write access to a resource within the primary PDH block 14 sends a read/write request packet to the primary processor agent 16 of the primary cell (cell 4) that is destined for the primary PDH block 14. When making the request, the sender typically is not aware as to whether a migration of critical resources from the primary PDH block 14 to another PDH block such as the secondary PDH block 28 is underway.

Next at a step 80, the primary processor agent 16 upon receiving the request packet throttles accesses for that partition to one outstanding access at a time while retrying other requests to the same address space, in order to maintain a coherent view of the computer system 1. Additionally, the primary processor agent 16 routes the packet off to the primary PDH block 14 by way of the dedicated communication link 20. Further, at a step 82 the primary PDH block 14 then performs a clone of the request to be sent over to the secondary PDH block 28. More particularly, at that step the primary PDH block 14 examines the request and determines how to perform the clone for the addressed resource. A clone mechanism that is generally suitable for a generic read/write resource is to clone a write for either a write or read request. Further, for a read-type request in particular, the primary PDH block 14 can perform a read of the resource and store the read data for later transmission to the sender (such as the sender/CPU making the request).

As mentioned above, different types of requests (e.g., read and write requests) in at least some circumstances are handled differently from one another when the computer system 1 is operating in the clone mode. More particularly, while the above-described mechanism is suitable for many read/write requests, it is not suitable for all such requests insofar as some resources have "side effects" such that special care should be exercised when performing migration of those resources. For example, one type of special case is a "read" side effect. With this type of a side effect, a read operation on a resource corrupts the resource for any future operations. Resources that are subject to read-side-effects can include, for example, stacks. Further for example, one such read side effect occurs when the OS will expect a certain value, but the migration process will corrupt the resource in performing a read to effect the migration. To avoid corruption that might otherwise occur due to such read side effects, either all read-side-effect resources in the primary PDH block 14 should be abolished, or a register address can be used to allow non-destructive state capture that allows migration via reads, without corruption of the resource. In some cases, the PDH hardware and firmware should employ an algorithm (such as side-door addresses) to create the clone.

Additionally, some resources also or instead have "write" side effects. As noted above, the generic cloning mechanism results in a write to the resource in the secondary PDH block 28 irrespective of whether the initial request to the primary PDH block 14 was a read request or a write request. However, resources with write side-effects, such as elements of the ACPI general purpose events (GPEs), are unable to tolerate such behavior and still maintain a valid clone. For resources such as these, the PDH hardware and firmware again can employ an algorithm, possibly including side-door addresses, to create the clone in the secondary PDH block 28 without using the normal functional destructive write address.

In addition to resources that have read or write side effects, still other resources can be referred to as autonomously updated resources. These can include, for example, virtual real time counters, watch dog timers, ACPI resources, high precision event timers (HPETs), I/O SAPICs, console/text/raw virtual Universal Asynchronous Receiver Transmitters (UARTs), and Intelligent Platform Management Interface (IPMI) block tables, among others. In the present embodiment, the handling of such autonomously updated resources during PDH migration varies with the different stages of the PDH migration, For example, in the clone mode when an autonomously updated resource is cloned from the primary PDH block 14 to the secondary PDH block 28, duplicate interrupts can be issued by the resource existing simultaneously on both the primary and the secondary PDH blocks. To avoid such duplicate interrupts from being issued during the clone mode of the PDH migration, all interrupts are primarily serviced by the PDH block that is in an active mode and serving as the functional PDH block, which in the present case is the primary PDH block 14.

In contrast to the clone mode where interrupts are generated only by the primary PDH block, in the TAS stage where both primary and secondary PDH blocks 14 and 28 respectively are simultaneously active for a short period of time, each of those PDH blocks can generate (or at least are capable of handling) interrupts. To avoid duplicate interrupts from being issued by one autonomously-updated resource, all interrupts are accumulated within the respective interrupt accumulators 15, 17 of the respective PDH blocks 14, 28 during the TAS stage of the PDH migration. In particular, as interrupts are issued in the TAS stage by autonomously updated resources, such interrupts, rather than being serviced right away, are instead directed to the respective interrupt accumulators 15, 17 of the respective PDH block 14, 28 for temporary accumulation. The accumulated interrupts within both the primary and the secondary PDH blocks 14, 28 respectively are eventually read by the firmware, which resolves duplicate interrupts to a single interrupt that is subsequently issued. Additionally, with respect to at least some autonomously-updated resources such as timers or a real time clocks (RTCs), the migration process can further include the performing of fabric flight-time calculations for a few packets from the primary PDH block 14 to the secondary PDH block 28 and back, in order to determine the proper offset to add to the timer or RTC in order to create a coherent clone.

It should be further noted that, given the variety of types of critical resources that can be found in the PDH blocks 14, 28, in order to perform the migration of critical resources, the processor agents 16, 30 in at least some embodiments include specialized hardware by which the processor agents recognize different characteristics of different types of critical resources. For example, cell IDs and Control Status Registers (CSRs) do not require migration, while the architected PDH external registers should be migrated. Also, among the many different critical resources that are potentially allocated to a given PDH block, some resources are considered owned by the OS, while some are owned by the CMI and still others are invisible to the OS.

In order to perform critical resource migration without involvement or awareness by the OS, the migration of OS-visible resources must occur coherently such that the OS does not notice whether or not it is communicating with the old PDH or the new PDH. For those resources owned by the CMI, migration can instead occur slowly behind the scenes (more particularly, the CMI is free to migrate those resources via the management fabric (or LAN) 38 or via in-band packets at any time prior to decommissioning the primary PDH. As for non-OS visible resources, migration (particularly cloning as described below) can occur "behind-the-scenes" via the fabric 8 or possibly the out-of-band fabric (or LAN) 38, as needed. However, in order to ensure that the OS sees a coherent and proper programming model view of the critical resources that it accesses, the OS-visible resources should be migrated using fabric-based reads and writes.

Referring still to FIG. 3, subsequent to performing the cloning operation (either in a generic manner for a standard read/write request or in a special manner given a special case), the clone is routed off to the secondary PDH block 28 through the fabric 8 at a step 84. More particularly, the clone is first sent over by the primary PDH block 14 to the primary processor agent 16, which in turn routes the request off to the fabric 8 and to the secondary processor agent 30. The secondary processor agent 30 then directs the clone to the secondary PDH block 28. Next, a step 86 is performed in which the secondary PDH block 28 satisfies the request associated with the clone received from the primary PDH block 14. As noted above, typically (e.g., other than in the special cases), the clone sent by the primary PDH block 14 is a write clone irrespective of whether the request from the sender was a read request or a write request. The secondary PDH block 28 upon receiving the clone commits (e.g., stores) the data present in the clone. For a read request, the data read by the primary PDH block 14 from a desired location is sent as part of the clone, which the secondary PDH block 28 commits. For a write request, the secondary PDH block 28 commits the data to the location specified in the clone packet.

Further, at a step 88, having acted in response to the clone, the secondary PDH block 28 then sends a response back to the primary PDH block 14 that provided the clone relating to the original read/write request. This response again is communicated via the fabric 8 and the processor agents 16, 30. The primary PDH block 14, upon receipt of the response from the secondary PDH block 28, at a step 90 in turn commits the write data for a write type request (no specific action is required for a read type request). Additionally at the step 90, for both read and write requests, a response packet with the result of the request is prepared by the primary PDH block 14. Finally at a step 92, the primary PDH block 14 sends the response back to the sender via the primary processor agent 16. The request is then considered to be satisfied and the process ends at a step 94.

Figure 4:
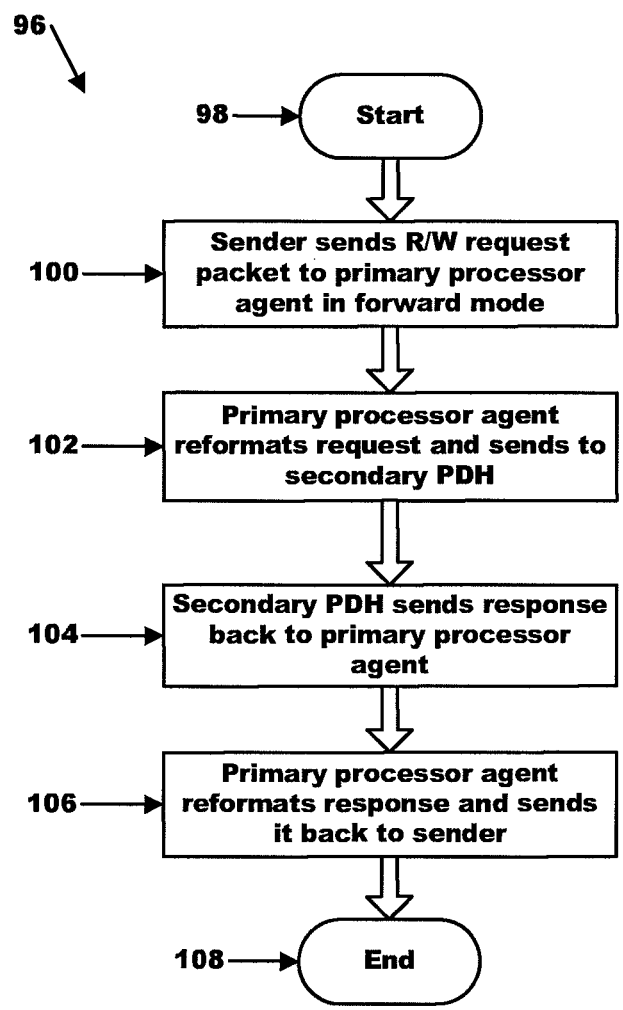
FIG. 4 is a flowchart showing exemplary steps of operation, which in particular relate to a second mode of handling read/write requests as part of the migrating of critical resources of FIG. 2, in accordance with one embodiment of the present invention.

Turning to FIG. 4, an additional flowchart 96 is provided that shows exemplary steps of operation that particularly relate to handling read/write requests by the primary processor agent 16 when it (and the overall system) is operating in the forward mode discussed above with respect to FIG. 2. The steps shown in FIG. 4 can be generally understood to be occurring as part of (or subsequent to) the step 66 of FIG. 2. As shown, after starting at a step 98, the process advances to a step 100 in which a sender desiring to access a critical resource of a PDH block sends a read/write request packet to the primary MA 16 located on the primary cell 4. The sender can be, for example, the CPU 10 of the cell 4 of FIG. 1, or potentially another CPU or other resource (typically one that is in communication with the fabric 8).

Next, at a step 102, the primary processor agent 16 upon receiving the request reformats that request packet to note itself as the sender, and the secondary PDH block 28 as the destination, and routes the packet to the destination secondary PDH block by way of the fabric 8 and the processor agent 30. Further, at a step 104, the secondary PDH block 28 determines the action to be taken upon receiving the request. This can depend somewhat upon the type of request. For example, upon receiving a read request, data is fetched from the location specified in the request while, for a write request data is committed to the location mentioned within the request. Once the request has been fulfilled, the secondary PDH block 28 sends a response to the primary processor agent 16 (which had noted itself as the sender) via the fabric 8 and the secondary processor agent 30. Subsequently, at a step 106, the primary processor agent 16 receives the response, reformats it so as to note the original sender (e.g., the CPU 10) as the sender, and then sends the response to that original sender, thereby fulfilling the request in a forward mode. In this manner, all read and write transactions bypass the primary PDH block 14 and complete at the secondary PDH block 28 only. The process then ends at a step 108.

While the processes described above with respect to FIGS. 2, 3 and 4 constitute one example of how critical resources of a PDH block utilized by the partition 2 within the computer system 1 can be migrated in a manner consistent with the proper handling of platform critical resources, and in a manner that does not require rebooting of the computer system or otherwise affect the OS (or other applications) running on the partition, the present invention is also intended to encompass a variety of other processes, including modifications and/or refinements of the above-described processes. Also, while the computer system 1 shown in FIG. 1 is one example of a computer system in which processes such as those of FIGS. 2, 3 and 4 can be performed, the present invention is also intended to encompass a variety of other computer systems having different hardware resources and other features than that of the computer system 1 including, for example, computer systems having more than one partition, more or less than two cells, and any arbitrary number of cores. Additionally, the printed circuit board(s) on which the cells 4 and 6 are formed can be understood to mean a module, a blade or possibly even a cell in other embodiments. Also, each of the hardware components of the computer system 1 can potentially be formed of Application Specific Integrated Circuit (ASIC) chips, Very Large Scale Integration (VLSI) chips and/or Field Programmable Gate Array (FPGA) chips.

The particular process steps and stages employed above to migrate PDH resources from a primary cell to a secondary cell, the programming of the various hardware components, and other features can all be varied depending upon the type/needs of the computer system being used and the applications being executed. For example, while the above description of the operation of the computer system 1 primarily envisions the sending of requests by the CPU located on the primary cell, it should be understood that it is also possible for requests to be provided from other sources including, for example, one or more of the cores on the secondary cell, and/or peripherals of other sorts (e.g. I/O devices) within the computer system 1. In such cases, the requests can be handled in the same manner as that described above, or at least in manners similar or analogous to that described above.

It is specifically intended that the present invention not be limited to the embodiments and illustrations contained herein, but include modified forms of those embodiments including portions of the embodiments and combinations of elements of different embodiments as come within the scope of the following claims.

We claim:

1. A system for migrating at least one critical resource during a migration of an operative portion of a computer system, the system comprising:
   an intermediary fabric component;
   first and second agent components coupled by way of the intermediary fabric component; and
   first and second additional components each of which is capable of supporting the at least one critical resource,
   wherein a first of the at least one critical resource supported by the first additional component is capable of being substantially copied to the second additional component via the first and second agent components and the intermediary fabric component,
   wherein, during operation of the system in a transfer of active status mode, interrupts issuing from at least one autonomously-updated resource implemented upon each of the first and second additional components are accumulated in first and second interrupt accumulators associated with the first and second additional components, respectively, prior to a later time at which a process is performed to eliminate duplicative ones of the interrupts.

* * * * *